(12) United States Patent
Yang et al.

(10) Patent No.: US 11,671,500 B2
(45) Date of Patent: Jun. 6, 2023

(54) INTERNET OF THINGS SYSTEM

(71) Applicant: Merry Electronics(Shenzhen) Co., Ltd., ShenZhen (CN)

(72) Inventors: Yun Han Yang, Taichung (TW); Yi Lin Hsieh, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 0 days.

(21) Appl. No.: 17/472,496

(22) Filed: Sep. 10, 2021

(65) Prior Publication Data

US 2023/0049198 A1 Feb. 16, 2023

(30) Foreign Application Priority Data

Aug. 13, 2021 (TW) .................................. 110129999

(51) Int. Cl.
*H04L 67/12* (2022.01)
*H04L 51/18* (2022.01)
*G16Y 40/30* (2020.01)
*H04L 67/10* (2022.01)

(52) U.S. Cl.
CPC .............. *H04L 67/12* (2013.01); *G16Y 40/30* (2020.01); *H04L 51/18* (2013.01); *H04L 67/10* (2013.01)

(58) Field of Classification Search
CPC ......... H04L 67/12; H04L 51/18; H04L 67/10; G16Y 40/30
See application file for complete search history.

(56) References Cited

U.S. PATENT DOCUMENTS

| | | | |
|---|---|---|---|
| 11,063,916 B1 * | 7/2021 | Ferreira | G05B 19/054 |
| 2020/0028937 A1 * | 1/2020 | Xu | H04L 67/61 |
| 2020/0104094 A1 * | 4/2020 | White | G10L 17/00 |
| 2020/0177517 A1 * | 6/2020 | Pancras | H04L 47/6215 |
| 2020/0228611 A1 * | 7/2020 | McDonald | H04L 67/142 |
| 2021/0149950 A1 * | 5/2021 | Fourman | G06F 16/61 |

* cited by examiner

Primary Examiner — Cheikh T Ndiaye
(74) Attorney, Agent, or Firm — JCIPRNET

(57) ABSTRACT

An Internet of Things (IoT) system is provided. The IoT system includes a plurality of terminal devices, a cloud device, and a human machine interface device. The cloud device is communicatively connected to the terminal devices. The human-machine interface device is communicatively connected to the cloud device via a plurality of first communication channels, and is used for determining a subscription sequence according to a piece of priority information of a plurality of control commands. The human-machine interface device schedules and dynamically subscribes to the first communication channels according to the subscription sequence, so as to transmit the control commands to the cloud device through different first communication channels according to the subscription sequence, so that the cloud device transmits the control commands to the corresponding terminal devices.

18 Claims, 6 Drawing Sheets

INTERNET OF THINGS SYSTEM

CROSS-REFERENCE TO RELATED APPLICATION

This application claims the priority benefit of Taiwan application serial no. 110129999, filed on Aug. 13, 2021. The entirety of the above-mentioned patent application is hereby incorporated by reference herein and made a part of this specification.

BACKGROUND

Technical Field

The disclosure relates to a communication architecture, and in particular to an Internet of Things system.

Description of Related Art

The architecture of a traditional Internet of Things (IoT) system may be built based on the Message Queuing Telemetry Transport (MQTT) protocol. The terminal device of the traditional IoT system establishes a connection with a cloud server through a channel with a Universally Unique Identifier (UUID). In this regard, the terminal device transmits and receives data through this channel, and a human machine interface device controls the terminal device through this channel. However, when the number of terminal devices increases and exceeds the limit of the number of subscription channels, the traditional IoT system cannot efficiently manage or control a large number of terminal devices at the same time, and the computing load of the human machine interface device may even exceeds the load limit, causing security concerns on the user side. Therefore, efficiently managing or controlling a large number of terminal devices when the number of subscription channels is limited is one of the important directions of research in the field of IoT.

SUMMARY

The disclosure provides an Internet of Things (IoT) system which efficiently controls a large number of terminal devices.

An IoT system in the disclosure includes multiple terminal devices, a cloud device, and a human machine interface device. The cloud device is communicatively connected to the terminal devices. The human machine interface device is communicatively connected to the cloud device via multiple first communication channels, and is adapted for determining a subscription sequence according to priority information of multiple control commands. The human machine interface device schedules and dynamically subscribes to the first communication channels according to the subscription sequence, so as to transmit the control commands to the cloud device via different first communication channels according to the subscription sequence, so that the cloud device transmits the control commands to the corresponding terminal devices.

Based on the above, the IoT system of the disclosure efficiently schedules and dynamically subscribes to multiple first communication channels to transmit multiple control commands to the cloud device by determining the priority sequence of the control commands. The cloud device transmits the control commands to multiple corresponding terminal devices. Therefore, the IoT system of the disclosure effectively controls a large number of terminal devices.

To provide a further understanding of the above features and advantages of the disclosure, embodiments accompanied with drawings are described below in details.

DESCRIPTION OF THE EMBODIMENTS

Figure 1:
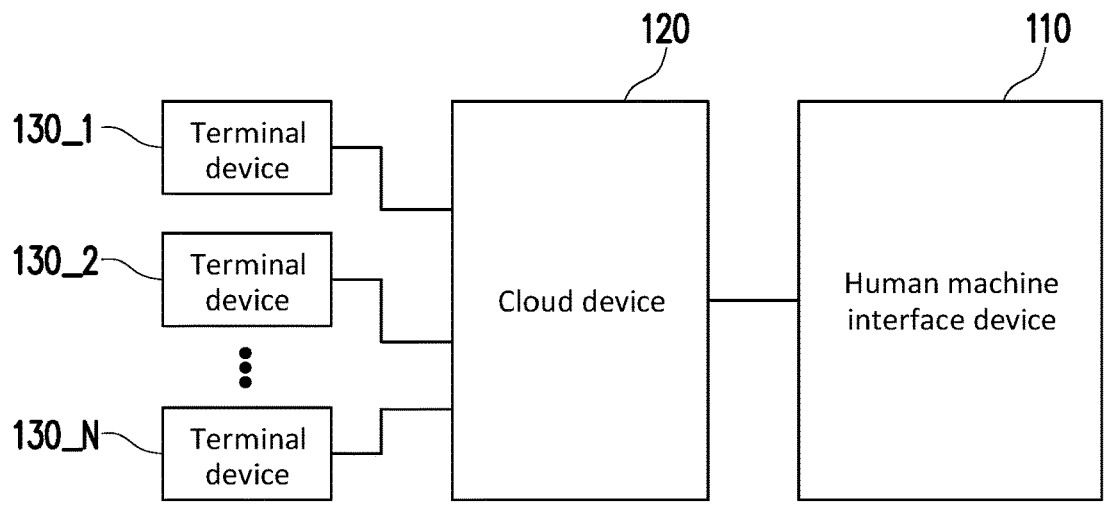
FIG. 1 is a schematic diagram of an Internet of Things (IoT) system according to an embodiment of the disclosure.

To provide a further understanding of the content of the disclosure, the following embodiments are used as examples based on which the disclosure may be realized. In addition, wherever possible, elements/components/steps with the same reference numeral in the drawings and embodiments represent the same or similar components.

FIG. 1 is a schematic diagram of an Internet of Things (IoT) system according to an embodiment of the disclosure. Referring to FIG. 1, an Internet of Things (IoT) system 100 includes a human machine interface device 110, a cloud device 120, and a plurality of terminal devices 130_1 to 130_N, where N is a positive integer. In this embodiment, the cloud device 120 may be communicatively connected to the terminal devices 130_1 to 130_N. The human machine interface (HMI) device 110 may establish a plurality of first communication channels to be communicatively connected to the cloud device 120. The cloud device 120 may establish a plurality of second communication channels to be communicatively connected to the terminal devices 130_1 to 130_N. The number of first communication channels is limited, and the number of second communication channels may be greater than or equal to the number of first communication channels. It is worth noting that the number of terminal devices 130_1 to 130_N is greater than the number of the first communication channels. The human machine interface device 110 may also establish a first dedicated communication channel to be communicatively connected to the cloud device 120, and the cloud device 120 may establish one or more second dedicated communication channels to be communicatively connected to the terminal devices 130_1 to 130_N.

In addition, in an embodiment, the IoT system 100 may be, for example, applied to a home energy management system (HEMS), and manages the terminal device 130_1 to 130_N. The terminal devices 130_1 to 130_N may include, for example, corresponding to one or more IoT appliances in users' homes such as a solar appliance, a household appliance, and a related utility device. However, the application of the IoT system 100 of this embodiment is not limited to a household energy management system.

In this embodiment, the human machine interface device 110 may be a display device that may provide monitoring and control functions for users, and may install a corresponding application (app) or may execute a corresponding web program, and may be, for example, a smart phone, a tablet computer, and a notebook computer, and the disclosure is not limited thereto. In this embodiment, the human machine interface device 110 may determine a subscription sequence according to priority information of a plurality of control commands, and may schedule and dynamically subscribe to a plurality of first communication channels according to the subscription sequence to transmit the control commands to the cloud device 120 via different first communication channels according to the subscription sequence, so that the cloud device 120 may transmit the control commands to the corresponding terminal devices 130_1 to 130_N via different second communication channels. In addition, the terminal devices 130_1 to 130_N may respectively return a plurality of corresponding IoT messages to the cloud device 120 via different second communication channels, so that the cloud device 120 may transmit the corresponding IoT messages to the human machine interface device 110. In this way, the human machine interface device 110 may effectively control and monitor the terminal devices 130_1 to 130_N. In addition, the IoT messages of this embodiment may respectively include, for example, at least one of device status information, sensing data, and a reply command.

Figure 2:
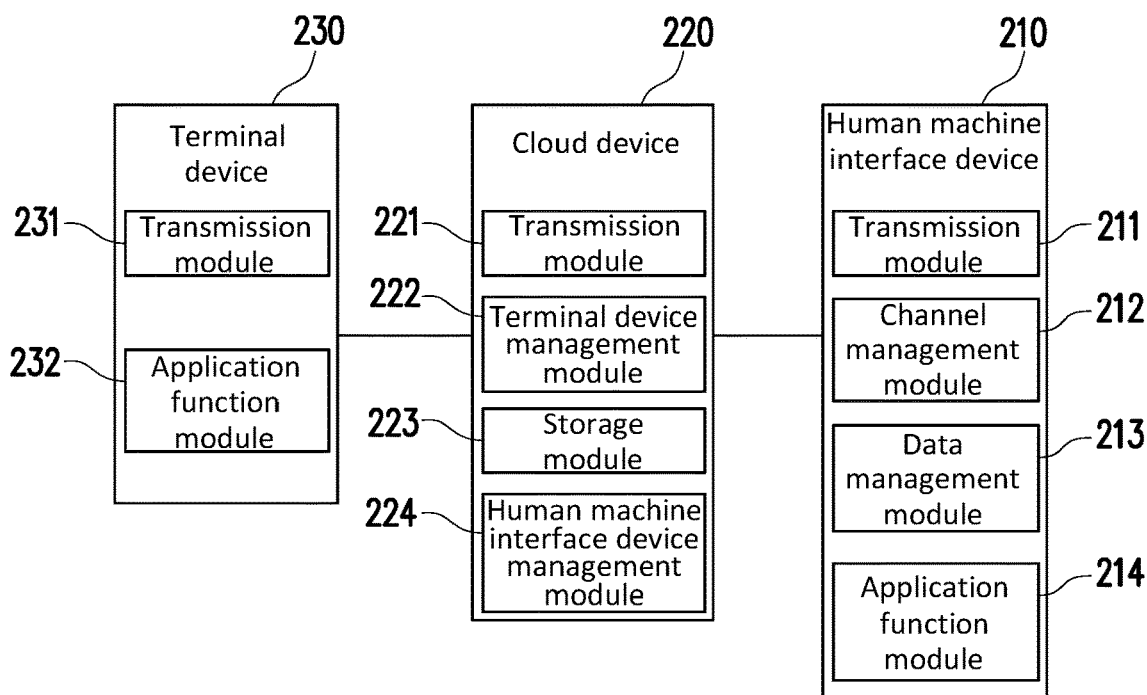
FIG. 2 is a schematic diagram of an IoT system according to another embodiment of the disclosure.

FIG. 2 is a schematic diagram of an IoT system according to another embodiment of the disclosure. Referring to FIG. 2, an IoT system 200 includes a human machine interface device 210, a cloud device 220, and a terminal device 230. This embodiment is described by taking the terminal device 230 as an example, and each of the terminal devices 130_1 to 130_N in FIG. 1 respectively realizes the terminal device 230 in FIG. 2. In this embodiment, the human machine interface device 210 may include a transmission module 211, a communication management module 212, a data management module 213, and an application function module 214. In this embodiment, the cloud device 220 may include a transmission module 221, a terminal device management module 222, a storage module 223, and a human machine interface device management module 224. The terminal device 230 may include a transmission module 231 and an application function module 232. In this embodiment, the human machine interface device 210, the cloud device 220, and the terminal device 230 may respectively include a processor and a memory corresponding to their own device specifications, and the memories may respectively be used to store the modules mentioned above for the processors to respectively access and perform related functions. In this regard, the above modules may be realized in the form of software or firmware combined with hardware circuits, and the processors may respectively execute corresponding algorithms to realize related functions thereof.

In this embodiment, the transmission modules 211, 221, and 231 may be realized based on the Message Queuing Telemetry Transport (MQTT) communication protocol, and may include a wired or wireless transport interface to realize the communicative connection and message sending and receiving between the human machine interface device 210, the cloud device 220, and the terminal device 230. The transmission module 211 of the human machine interface device 210 may be communicatively connected to the transmission module 221 of the cloud device 220, and may transmit and receive messages based on the MQTT communication protocol. The transmission module 221 of the cloud device 220 may be communicatively connected to the transmission module 231 of the terminal device 230, and may transmit and receive messages based on the MQTT communication protocol.

In this embodiment, the channel management module 212 of the human machine interface device 210 may schedule and allocate the subscription to the first communication channels corresponding to different terminal devices in a limited number of channels to perform transport of different control commands. In this embodiment, the data management module 213 of the human machine interface device 210 may further use a first dedicated communication channel to receive an organized message of a plurality of terminal devices transmitted by the cloud device 220, and may transmit a request control command. In this embodiment, the cloud device 220 may organize a plurality of IoT messages of at least a portion of a plurality of terminal devices to generate the organized message. In this embodiment, the application function module 214 of the human machine interface device 210 may display a user interface with an operation screen and related functions on the display screen of the human machine interface device 210, so that users may control and monitor a plurality of terminal devices through the human machine interface device 210.

In this embodiment, the terminal device management module 222 of the cloud device 220 may classify the control commands provided by the human machine interface device 210 and a plurality of IoT messages returned by the terminal devices 230, and may further explore the first dedicated communication channel connecting to the human machine interface device 210 and the second dedicated communication channel connecting to a plurality of terminal devices, and may perform a message push operation. In this embodiment, the storage module 223 of the cloud device 220 may, for example, use a binary tree data structure technology to store a plurality of connection messages and a plurality of IoT messages of a plurality of terminal devices, and may further temporarily store the control commands provided by the human machine interface device 210. In this embodiment, the human machine interface device management module 224 of the cloud device 220 may manage the connection status of a plurality of terminal devices and the schedule of related message pushes.

In this embodiment, the application function module 232 of the terminal device 230 may realize specific application functions (such as the sensing function of a certain sensor), and may generate an IoT message corresponding to a specific application function, and transmit the IoT message to the cloud device 220 via the corresponding second communication channel or the corresponding second dedicated communication channel. The application function module 232 of the terminal device 230 may also receive the corresponding control command and the request control command from the cloud device 220 via the corresponding second communication channel or the corresponding second dedicated communication channel, so as to perform a corresponding operation according to the control command or the request control command. In addition, the implementation method of the aforementioned modules will be described in detail by the following exemplary embodiments of schematic diagrams of operations in FIGS. 3 to 8.

Figure 3:
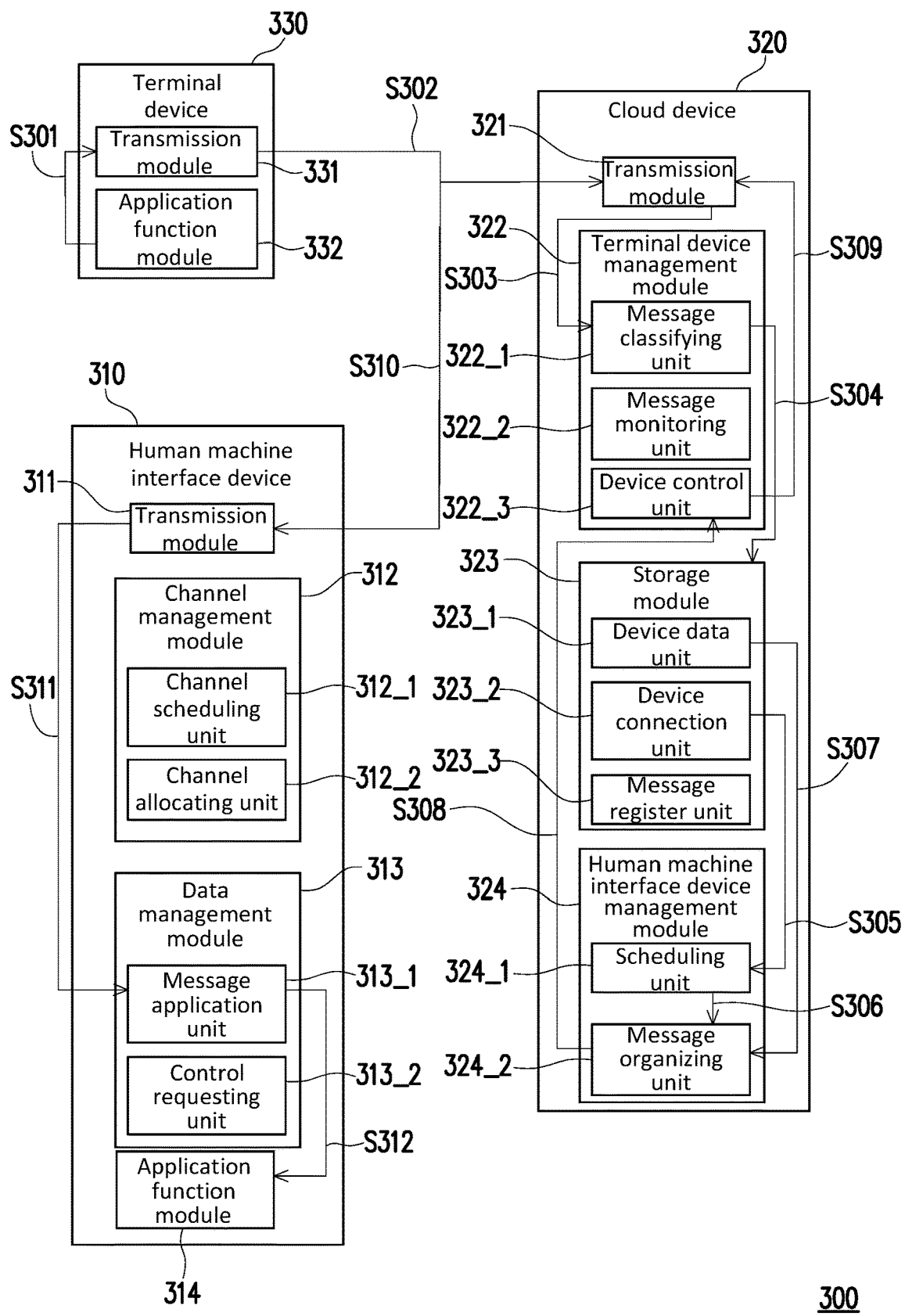
FIG. 3 is a schematic diagram of the operation of managing a terminal device according to an embodiment of the disclosure.

FIG. 3 is a schematic diagram of the operation of managing a terminal device according to an embodiment of the disclosure. An IoT system 300 includes a human machine interface device 310, a cloud device 320, and a terminal device 330. In this embodiment, a channel management module 312 of the human machine interface device 310 may include a channel scheduling unit 312_1 and a channel allocating unit 312_2. The channel scheduling unit 312_1 may calculate the subscription sequence according to the priority information of a plurality of control commands. The channel allocating unit 312_2 may allocate a plurality of first communication channels according to the subscription sequence, so as to transmit a plurality of control commands to subscribe to the first communication channels in sequence. In this embodiment, a data management module 313 of the human machine interface device 310 may include a message application unit 313_1 and a control requesting unit 313_2. The message application unit 313_1 may receive the organized message transmitted by the cloud device 320 via the first dedicated communication channel, and may classify the organized message. The cloud device 320 may organize a plurality of IoT messages of at least a portion of the terminal devices 330 to generate an organized message. In this embodiment, when all the first communication channels are occupied, the data management module 313 may transfer at least one control command with a higher priority to the control requesting unit 313_2 to transmit the corresponding request control command to the cloud device 320 via the first dedicated communication channel. In this embodiment, an application function module 314 of the human machine interface device 310 may generate a control command, and may receive the classified organized message provided by the message application unit 313_1.

In this embodiment, a terminal device management module 322 of the cloud device 320 may include a message classifying unit 322_1, a message monitoring unit 322_2, and a device control unit 322_3. The message classifying unit 322_1 may classify and store a plurality of device connection messages and a plurality of IoT messages received by a transmission module 321 into a device data unit 323_1 and a device connection unit 323_2 of the storage module 323. The message monitoring unit 322_2 may monitor the device data unit 323_1 to determine whether at least one of a plurality of terminal devices has not returned the IoT message. The device control unit 322_3 may explore the terminal devices to establish a connection with at least one corresponding terminal device.

In this embodiment, the storage module 323 of the cloud device 320 may include device the data unit 323_1, the device connection unit 323_2, and a message register unit 323_3. The device data unit 323_1 may store a control instruction and an IoT message of the human machine interface device 310 and the terminal devices 330, respectively. The device connection unit 323_2 may store a plurality of pieces of device connection information corresponding to the human machine interface device 310 and the terminal devices 330, respectively. The message register unit 323_3 may store a plurality of control commands to be transmitted to the terminal devices.

In this embodiment, a human machine interface device management module 324 of the cloud device 320 may include a scheduling unit 324_1 and a message organizing unit 324_2. The scheduling unit 324_1 may monitor the device connection information of the human machine interface device 310 stored in the device connection unit 323_2 to generate a message push schedule. The message organizing unit 324_2 may organize at least one IoT message of at least one terminal device 330 stored in the device data unit 323_1 to generate an organized message.

The description of the above-mentioned FIGS. 1 and 2 may be referred to for the function and implementation method of related modules and units executed by the human machine interface device 310, the cloud device 320, and the terminal device 330 of the IoT system 300 in this embodiment, so details thereof will not be repeated herein.

In this embodiment, the human machine interface device 310, the cloud device 320, and the terminal device 330 of the IoT system 300 may be operated by steps S301 to S312 to realize the function of managing the terminal device 330. It is worth noting that this embodiment is illustrated with the terminal device 330 as an example, and the implementation method of a communicative connection to a plurality of terminal devices may be analogized. In step S301, an application function module 332 of the terminal device 330 may output the corresponding IoT message to a transmission module 331 according to, for example, the sensing result of the sensor or the operation status of the terminal device 330. In step S302, the transmission module 331 may transmit the IoT message to the transmission module 321 of the cloud device 320. In step S303, the transmission module 321 may provide the IoT message to the message classifying unit 322_1.

In step S304, the message classifying unit 322_1 may classify the IoT message according to the status or data format, and store the IoT message to the device data unit 323_1 and the device connection unit 323_2 of the storage module 323. In step S305, the scheduling unit 324_1 may determine the connection status between the terminal device 330 and the human machine interface device 310 through the device connection unit 323_2. In step S306, the scheduling unit 324_1 may control the message organizing unit 324_2 according to the time schedule of the preset message push. In step S307, the message organizing unit 324_2 may read the aforementioned IoT message and other IoT messages corresponding to other terminal devices from the device data unit 323_1, and perform message organization to generate an organized message.

In step S308, the message organizing unit 324_2 may provide the organized message to the device control unit 322_3. In step S309, the device control unit 322_3 may provide the organized message to the transmission module 321 according to the message push schedule, and subscribe to the first dedicated communication channel for message transmission. In step S310, the transmission module 321 may transmit the organized message to the transmission module 311 of the human machine interface device 310 via the first dedicated communication channel. In step S311, the transmission module 311 may transmit the organized message to the message application unit 313_1. In step S312, the message application unit 313_1 may classify the organized message and transmit the organized message to the application function module 314, so that the user may realize the function of monitoring and managing the terminal device 330 by operating the application function module 314 of the human machine interface device 310.

In other words, when the cloud device 320 is connected to a plurality of terminal devices, the cloud device 320 may collect a plurality of the IoT messages of the terminal devices 330 through the above-mentioned steps S301 to S304, respectively. Moreover, after the messages are organized, the human machine interface device 310 only needs to subscribe to one first dedicated channel between the human machine interface device 310 and the cloud device 320 to obtain a large number of IoT messages of a large number of terminal devices at the same time. Therefore, the IoT system 300 of this embodiment may realize the function of monitoring or managing a large number of terminal devices at the same time.

Figure 4:
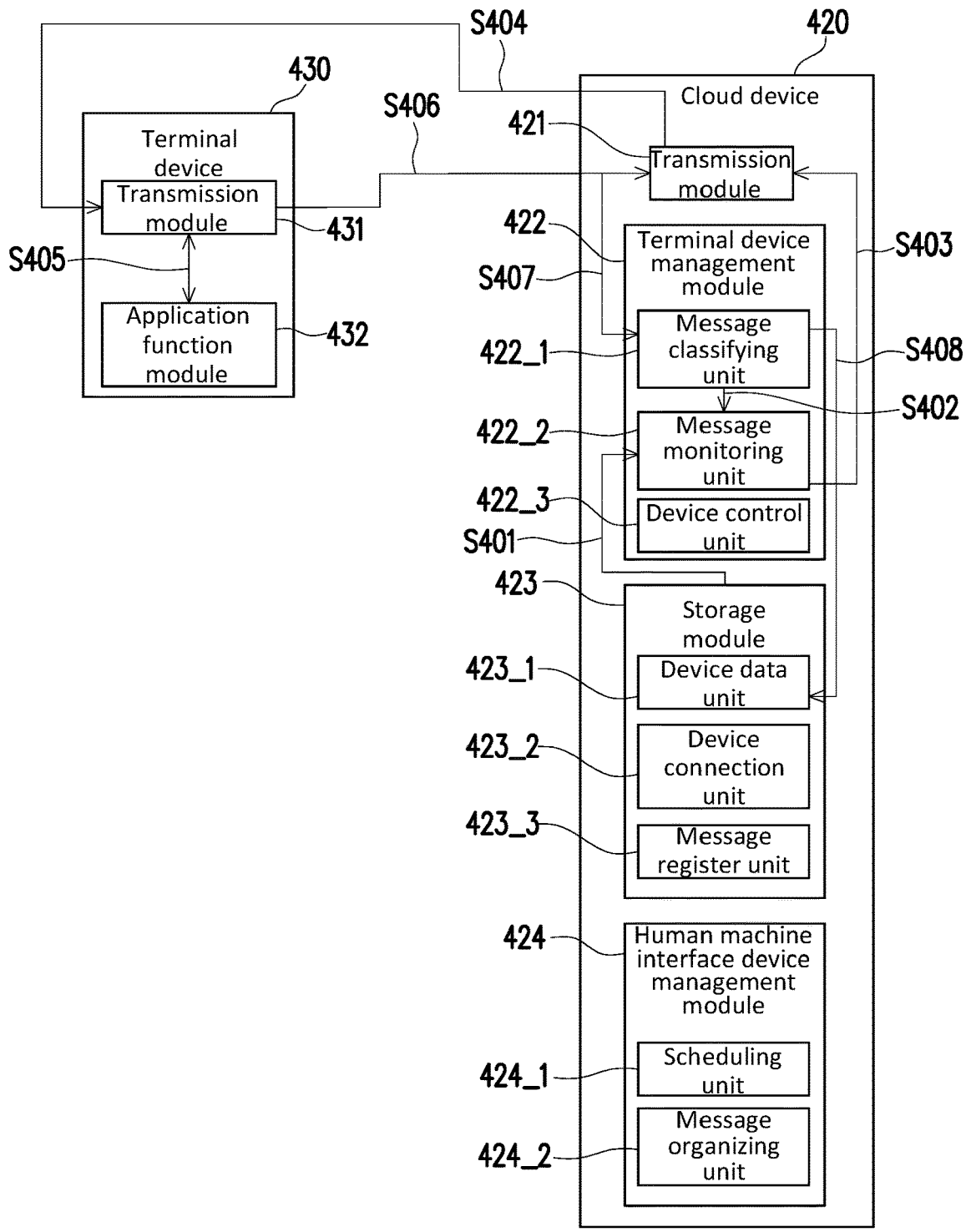
FIG. 4 is a schematic diagram of the operation of monitoring an IoT message according to an embodiment of the disclosure.

FIG. 4 is a schematic diagram of the operation of monitoring an IoT message according to an embodiment of the disclosure. Referring to FIG. 4, the description of the above-mentioned embodiments of FIGS. 1 to 3 may be referred to for the function and related technical features of related modules and units executed by a cloud device 420 and a terminal device 430 of an IoT system 400 of this embodiment, so details thereof will not be repeated herein. In this embodiment, the cloud device 420 and terminal device 430 of the IoT system 400 may execute the following steps S401 to S408 to realize the function of monitoring an IoT message. In step S401, a message monitoring unit 422_2 continuously checks the data of a device data unit 423_1 and a device connection unit 423_2 in a storage module 423. When the message monitoring unit 422_2 determines that the terminal device 430 has not returned an IoT message, in step S402, the message monitoring unit 422_2 operates a device control unit 422_3.

In step S403, the message monitoring unit 422_2 may transmit a status report command to a transmission module 421 through the device control unit 422_3. In step S404, the transmission module 421 may transmit the status report command to a transmission module 431 of the terminal device 430 via the second dedicated communication channel between the transmission module 421 and the terminal device 430. In step S405, an application function module 432 of the terminal device 430 may receive the status report command provided by the transmission module 431, and return the corresponding IoT message to the transmission module 431. In step S406, the terminal device 430 may return the IoT message to the transmission module 421 of the cloud device 420 through the transmission module 431 according to the status report command. In step S407, a message classifying unit 422_1 may classify the IoT message according to the status or data format. In step S408, the message classifying unit 422_1 may store the classified IoT message to the device data unit 423_1 of the storage module 423. Therefore, the IoT system 400 of this embodiment may ensure that the device data unit 423_1 in the storage module 423 of the cloud device 420 may stably update the latest status of each of the terminal devices, so as to effectively avoid data loss caused by an unstable connection status.

Figure 5:
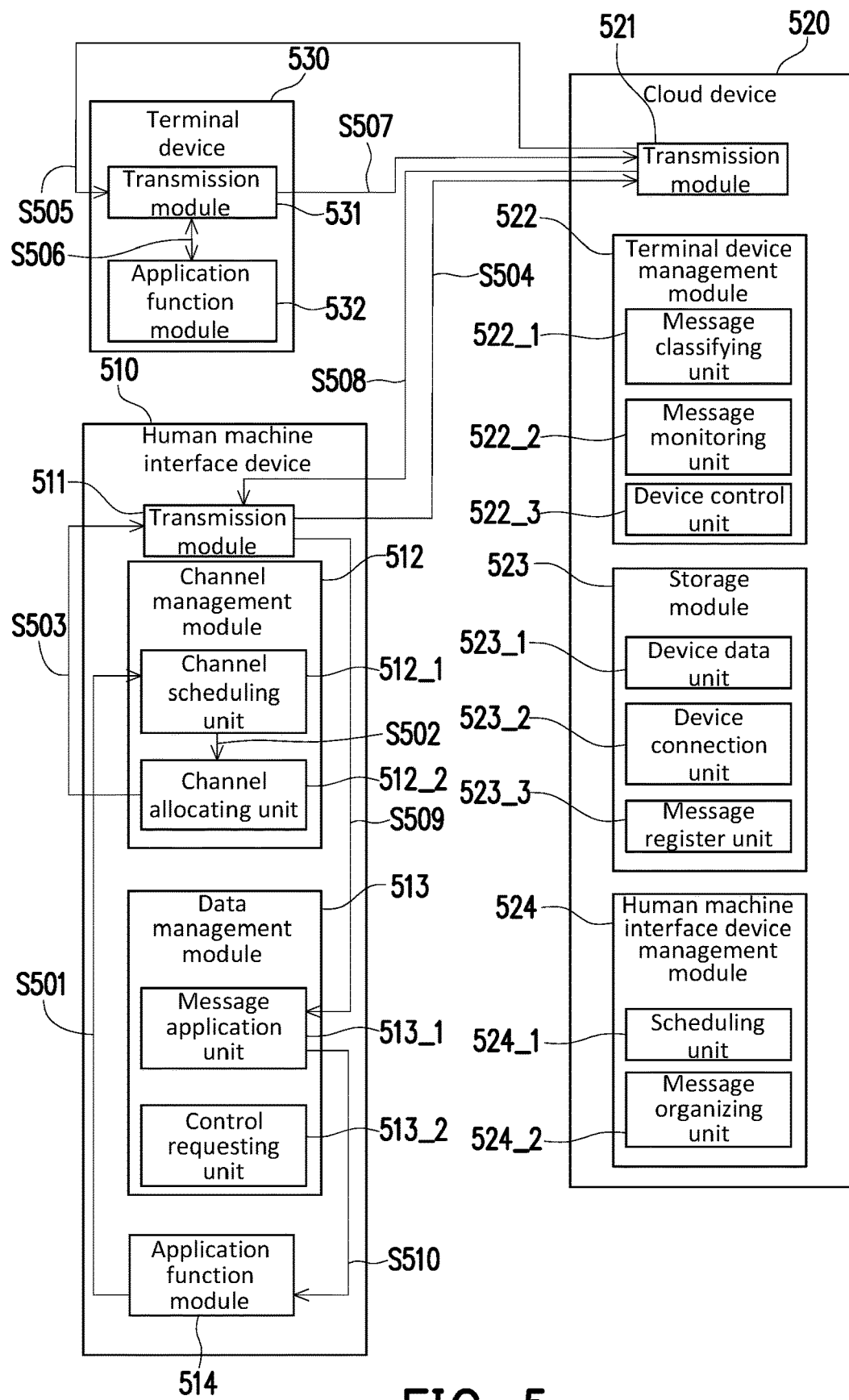
FIG. 5 is a schematic diagram of the operation of an IoT system being executed in a general mode according to an embodiment of the disclosure.

FIG. 5 is a schematic diagram of the operation of an IoT system being executed in a general mode according to an embodiment of the disclosure. Referring to FIG. 5, the description of the above-mentioned embodiments of FIGS. 1 to 4 may be referred to for the function and related technical features of related modules and units executed by a human machine interface device 510, a cloud device 520, and a terminal device 530 of an IoT system 500 of this embodiment, so details thereof will not be repeated herein. In this embodiment, the human machine interface device 510, the cloud device 520, and the terminal device 530 of the IoT system 500 may execute the following steps S501 to S510 to realize the function of controlling the terminal device 530 to be in the general mode. In step S501, the user may transmit a control command to a channel scheduling unit 512_1 of a channel management module 512 by operating an application function module 514 of the human machine interface device 510. In this embodiment, the channel scheduling unit 512_1 may include a command queue. The channel scheduling unit 512_1 may sort the control command into the command queue according to a subscription sequence. In this regard, the channel scheduling unit 512_1 may calculate a priority sequence and update the command queue according to information such as the level and priority of the control command. A channel allocating unit 512_2 subscribes to a free first communication channel in sequence according to the sequence of the control command in the command queue, and dynamically releases the first communication channel that has completed the transmission of the control command, so that the first communication channel may be subscribed to by the control command to be transmitted in the next sequence. In step S503, the channel allocating unit 512_2 transmits the control command to a transmission module 511, so that the transmission module 511 may transmit the control command to a transmission module 521 of the cloud device 520 via the subscribed first communication channel in step S504. In step S505, the transmission module 521 of the cloud device 520 may transmit the control command to a transmission module 531 of the terminal device 530 via the corresponding second communication channel. It is worth noting that the channel allocating unit 512_2 may calculate and set the dynamic release time of the subscribed first communication channel and the corresponding second communication channel to improve channel throughput.

In step S506, an application function module 532 of the terminal device 530 may receive the control command provided by the transmission module 531, and return the corresponding IoT message to the transmission module 531. In step S507, the terminal device 530 may return the IoT message to the transmission module 521 of the cloud device 520 through the transmission module 531. In step S508, the transmission module 521 may transmit the IoT message to the transmission module 511 of the human machine interface device 510 via the subscribed first communication channel. In step S509, the transmission module 511 may transmit the IoT message to a message application unit 513_1. In step S510, the message application unit 513_1 may classify the IoT message and transmit the IoT message to the application function module 514, so that the user may obtain the IoT message returned by the terminal device 530 by operating the application function module 514 of the human machine interface device 510. Therefore, the IoT system 500 of this embodiment may be operated in the general mode to efficiently control the terminal device 530 and realize the function of operating a large number of terminal devices at the same time.

In this embodiment, the channel allocating unit 512_2 may subscribe to the free first communication channel and the corresponding second communication channel in sequence according to the command queue, and dynamically release the first communication channel that has completed the transmission of the control command and the corresponding second communication channel for the control command to be transmitted in the next sequence to subscribe to. In other words, when the cloud device 520 is communicatively connected to a plurality of terminal devices, the user may control these terminal devices through the human machine interface device 510 without being limited by the number of channels, so as to realize an efficient terminal device control function. The IoT system 500 of this embodiment may effectively ensure that the human machine interface device 510 may perform efficient channel scheduling and allocation through the channel management module 512 under the limited number of first communication channels.

Figure 6:
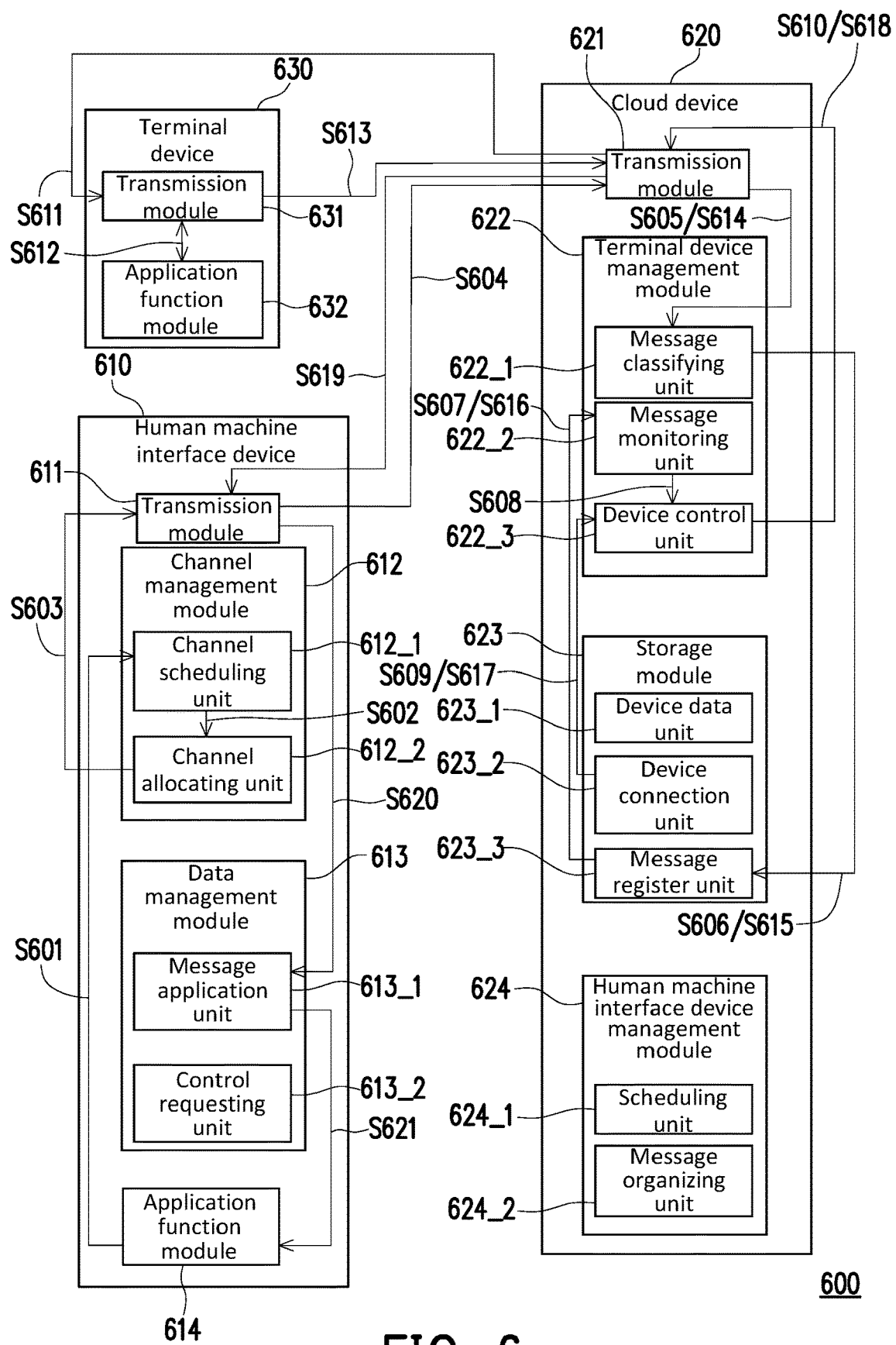
FIG. 6 is a schematic diagram of the operation of an IoT system being executed in a timeout mode according to an embodiment of the disclosure.

FIG. 6 is a schematic diagram of the operation of an IoT system being executed in a timeout mode according to an embodiment of the disclosure. Referring to FIG. 6, the description of the above-mentioned embodiments of FIGS. 1 to 3 may be referred to for the function and related technical features of related modules and units executed by a human machine interface device 610, a cloud device 620, and a terminal device 630 of an IoT system 600, so details thereof will not be repeated herein. In this embodiment, the human machine interface device 610, the cloud device 620, and the terminal device 630 of the IoT system 600 may execute the following steps S601 to S621 to realize the timeout mode function of the control terminal device 630. In step S601, the user may transmit a control command to a channel scheduling unit 612_1 of a channel management module 612 by operating an application function module 614 of the human machine interface device 610. In this embodiment, the channel scheduling unit 612_1 may include a command queue. The channel scheduling unit 612_1 may sort the control command into the command queue according to a subscription sequence. In this regard, the channel scheduling unit 612_1 may calculate a priority sequence and update the command queue according to information such as the level and priority of the control command. A channel allocating unit 612_2 dynamically subscribes to one of a limited number of first communication channels (including the corresponding second communication channel) according to the sequence of the control command in the command queue, and subscribes to one of the first communication channels corresponding to the terminal device 630. In step S603, the channel allocating unit 612_2 transmits the control command to a transmission module 611, so that the transmission module 611 may transmit the control command to a transmission module 621 of the cloud device 620 via the subscribed first communication channel in step S604. In step S605, a message classifying unit 622_1 of a terminal device management module 622 may receive the control command provided by the transmission module 621. In step S606, the message classifying unit 622_1 may classify the control command according to the status or data format and store the control command in a message register unit 623_3 of a storage module 623. In step S607, a message monitoring unit 622_2 may monitor whether the control command temporarily stored in the message register unit 623_3 has completed the transmission to the terminal device 630. In step S608, when the message monitoring unit 622_2 determines that the control command has timed out and has not completed the transmission to the corresponding terminal device 630, the message monitoring unit 622_2 may notify a device control unit 622_3. In step S609, the device control unit 622_3 may confirm the connection status of the terminal device 630 through a device connection unit 623_2. In step S610, when the connection status of the terminal device 630 is normal, the message monitoring unit 622_2 may retransmit the control command via a second dedicated communication channel connecting to the corresponding terminal device through the device control unit 622_3. In this regard, the device control unit 622_3 may generate a request control command according to the aforementioned untransmitted control command, and transmit the request control command to the transmission module 621.

In step S611, the transmission module 621 of the cloud device 620 may transmit the request control command to a transmission module 631 of the terminal device 630 via the corresponding second dedicated communication channel. In step S612, an application function module 632 of the terminal device 630 may receive the request control command provided by the transmission module 631, and return a corresponding IoT message to the transmission module 631. In step S613, the terminal device 630 may return the IoT message to the transmission module 621 of the cloud device 620 through the transmission module 631. In step S614, the message classifying unit 622_1 may receive and transmit the IoT message provided by the module 621. In step S615, the message classifying unit 622_1 may classify the IoT message according to the status or data format, and store the IoT message to the message register unit 623_3 of the storage module 623. In step S616, the message monitoring unit 622_2 may determine that the request control has been completed according to the IoT message temporarily stored in the message register unit 623_3. In step S617, the device control unit 622_3 may confirm the connection status of the human machine interface device 610 through the device connection unit 623_2. In step S618, the device control unit 622_3 may transmit the IoT message to the transmission module 621.

In step S619, the transmission module 621 may transmit the IoT message to the transmission module 611 of the human machine interface device 610 via a subscribed first dedicated communication channel. In step S620, the transmission module 631 may transmit the IoT message to a message application unit 613_1. In step S621, the message application unit 613_1 may classify the IoT message and transmit the IoT message to the application function module 614, so that the user may obtain the IoT message returned by the terminal device 630 by operating the application function module 614 of the human machine interface device 610. Therefore, the IoT system 600 of this embodiment may be operated in the timeout mode to perform the request control function on the terminal device 630. The IoT system 600 of this embodiment may effectively ensure that the control process between the human machine interface device 610 and the terminal device 630 does not cause control failure or data loss due to abnormal connections.

Figure 7:
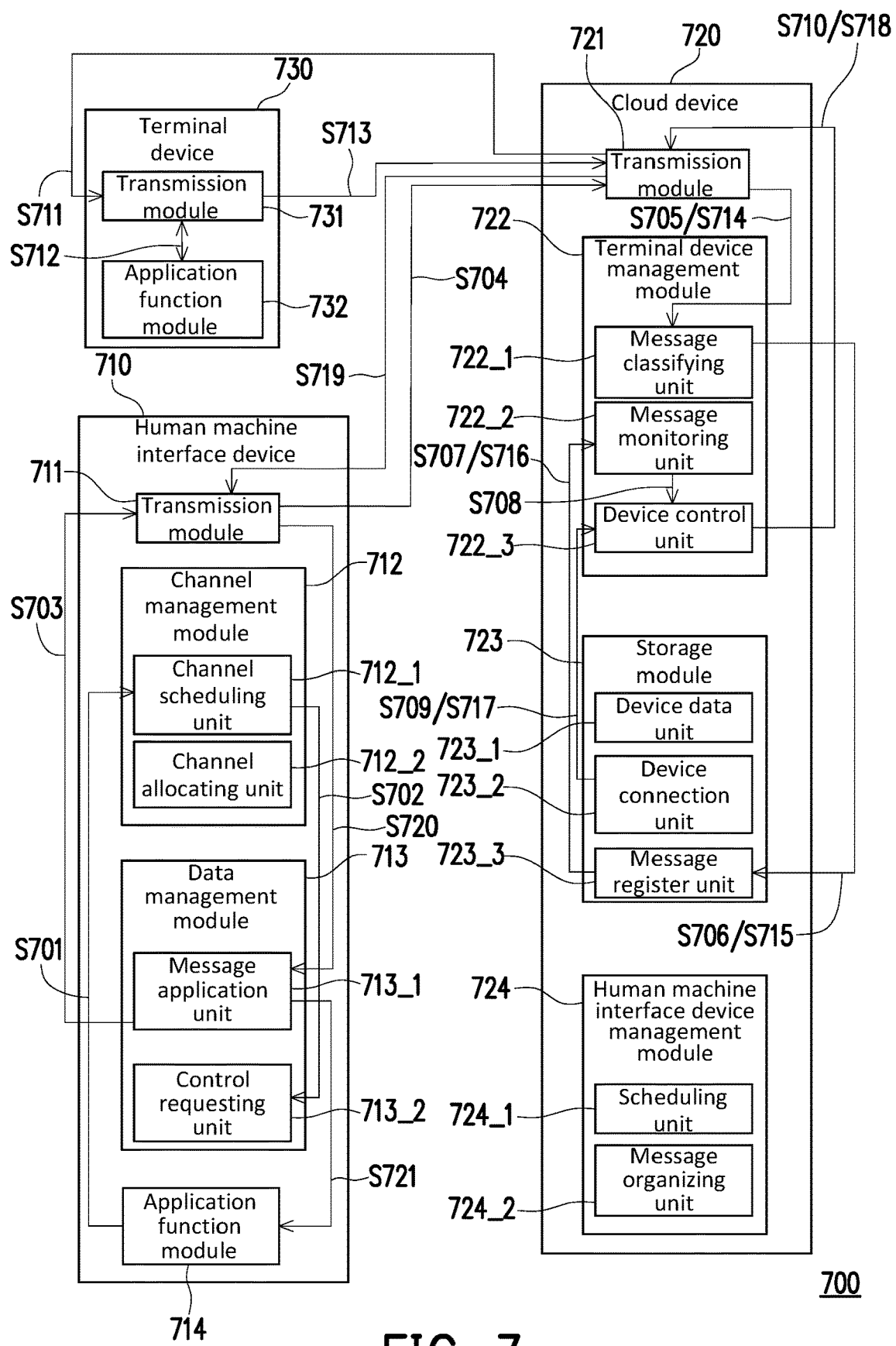
FIG. 7 is a schematic diagram of the operation of an IoT system being executed in a request mode according to an embodiment of the disclosure.

FIG. 7 is a schematic diagram of the operation of an IoT system being executed in a request mode according to an embodiment of the disclosure. Referring to FIG. 7, the description of the above-mentioned embodiments of FIGS. 1 to 3 may be referred to for the function and related technical features of related modules and units executed by a human machine interface device 710, a cloud device 720, and a terminal device 730 of an IoT system 700, so details thereof will not be repeated herein. In this embodiment, the human machine interface device 710, the cloud device 720, and the terminal device 730 of the IoT system 700 may execute the following steps S701 to S721 to realize the function of the request mode of the control terminal device 730. In step S701, the user may transmit a control command to a channel scheduling unit 712_1 of a channel management module 712 by operating an application function module 714 of the human machine interface device 710. In this embodiment, when the channel scheduling unit 712_1 detects that the command queue is congested and a higher-level (or higher-priority) control command is present, the channel scheduling unit 712_1 may transmit the control command with a higher level to a control requesting unit 713_2 of a data management module 713 to generate a corresponding request control command. In step S703, the control requesting unit 713_2 transmits the request control command to a transmission module 711. In step S704, the transmission module 711 may transmit the request control command to a transmission module 721 of the cloud device 720 via the first dedicated communication channel. In other words, when all the first communication channels are occupied, the channel scheduling unit 712_1 of this embodiment may transfer at least one control command (or emergency control command) with a higher priority to the control requesting unit 713_2 to transmit the corresponding request control command to the cloud device 720 via the first dedicated communication channel.

In step S705, a message classifying unit 722_1 of a terminal device management module 722 may receive the request control command provided by the transmission module 721. In step S706, the message classifying unit 722_1 may classify the request control command according to the status or data format, and store the request control command to a message register unit 723_3 of a storage module 723. In step S707, a message monitoring unit 722_2 may monitor whether the request control command temporarily stored in the message register unit 723_3 has completed the transmission to the terminal device 730. In step S708, the message monitoring unit 722_2 may notify a device control unit 722_3. In step S709, the device control unit 722_3 may confirm the connection status of the terminal device 730 through a device connection unit 723_2. In step S710, when the connection status of the terminal device 730 is normal, the device control unit 722_3 may transmit the request control command to the terminal device 730 via the second dedicated communication channel connecting to the terminal device 730.

In step S711, the transmission module 721 of the cloud device 720 may transmit the request control command to a transmission module 731 of the terminal device 730 via the corresponding second dedicated communication channel. In step S712, an application function module 732 of the terminal device 730 may receive the request control command provided by the transmission module 731, and return a corresponding IoT message to the transmission module 731. In step S713, the terminal device 730 may return the IoT message to the transmission module 721 of the cloud device 720 through the transmission module 731. In step S714, the message classifying unit 722_1 may receive the IoT message provided by the module 721. In step S715, the message classifying unit 722_1 may classify the IoT message according to the status or data format, and store the IoT message in the message register unit 723_3 of the storage module 723. In step S716, the message monitoring unit 722_2 may determine that the request control has been completed according to the IoT message temporarily stored in the message register unit 723_3. In step S717, the device control unit 722_3 may confirm the connection status of the human machine interface device 710 through the device connection unit 723_2. In step S718, the device control unit 722_3 may transmit the IoT message to the transmission module 721.

In step S719, the transmission module 721 may transmit the IoT message to the transmission module 711 of the human machine interface device 710 via the first dedicated communication channel. In step S720, the transmission module 731 may transmit the IoT message to a message application unit 713_1. In step S721, the message application unit 713_1 may classify the IoT message and transmit the IoT message to an application function module 714, so that the user may obtain the IoT message returned by the terminal device 730 by operating the application function module 714 of the human machine interface device 710. Therefore, the IoT system 700 of this embodiment may be operated in the request mode to perform the request control function on the terminal device 730, and may effectively prevent delay of transmitting the emergency control command to the corresponding terminal device due to congestion of the first communication channel.

In summary, the IoT system of the disclosure may effectively control and monitor a large number of terminal devices in a situation of a limited number of communication channels. The IoT system of the disclosure may efficiently schedule and dynamically subscribe to the first communication channel to transmit the control command to the cloud device according to the priority sequence of the control command, and may dynamically release the first communication channel that completes the command transport for the next control command to use. In addition, the IoT system of the disclosure may also transmit control commands and emergency control commands that have timed out and have not been transmitted in the form of request control instructions to be transmitted via the dedicated communication channel to effectively avoid control failures, data loss, or delayed control.

Although the disclosure has been disclosed in the above by way of embodiments, the embodiments are not intended to limit the disclosure. Those with ordinary knowledge in the technical field can make various changes and modifications without departing from the spirit and scope of the disclosure. Therefore, the protection scope of the disclosure is subject to the scope of the appended claims.

What is claimed is:

1. An Internet of Things system, comprising:
   a plurality of terminal devices;
   a cloud device, communicatively connected to the terminal devices; and
   a human machine interface device, communicatively connected to the cloud device via a plurality of first communication channels, adapted for determining a subscription sequence according to priority information of a plurality of control commands,
   wherein the human machine interface device schedules and dynamically subscribes to the first communication channels according to the subscription sequence, so as to transmit the control commands to the cloud device via different first communication channels according to the subscription sequence, so that the cloud device transmits the control commands to the corresponding terminal devices,
   wherein the human machine interface device comprises:
      a channel management module, comprising:
         a channel scheduling unit, adapted for calculating the subscription sequence according to the priority information of the control commands; and
         a channel allocating unit, adapted for allocating the first communication channels according to the subscription sequence for the control commands to be transmitted to subscribe to in sequence,
   wherein the channel scheduling unit comprises a command queue, and the channel scheduling unit sorts the control commands into the command queue according to the subscription sequence, so that the channel allocating unit subscribes to the first communication channel that is free in sequence according to the command queue, and dynamically releases the first communication channel that has completed transmitting the control command for the control command to be transmitted in a next sequence to subscribe to.

2. The Internet of Things system according to claim 1, wherein the human machine interface device is further communicatively connected to the cloud device via a first dedicated communication channel, and the human machine interface device further comprises:
   a data management module, comprising:
      a message application unit, adapted for receiving an organized message transmitted by the cloud device via the first dedicated communication channel, wherein the cloud device organizes a plurality of Internet of Things messages of at least a portion of the terminal devices to generate the organized message.

3. The Internet of Things system according to claim 2, wherein the human machine interface device further comprises:
a control requesting unit, adapted for transferring at least one control command with a higher priority to the control requesting unit for the control requesting unit to transmit a corresponding request control command to the cloud device via the first dedicated communication channel when the first communication channels are all occupied.

4. The Internet of Things system according to claim 2, wherein the human machine interface device further comprises:
a first transmission module, adapted for establishing the first communication channels and the first dedicated communication channel, and sending and receiving a message to and from the cloud device based on a Message Queuing Telemetry Transport communication protocol.

5. The Internet of Things system according to claim 2, wherein the human machine interface device further comprises:
a first application function module, adapted for generating the control commands and receiving the organized message that is classified provided by the message application unit.

6. The Internet of Things system according to claim 1, wherein the cloud device comprises:
a second transmission module, adapted for establishing the first communication channels and a first dedicated communication channel connecting to the human machine interface device, and sending and receiving a message to and from the human machine interface device based on a Message Queuing Telemetry Transport communication protocol.

7. The Internet of Things system according to claim 6, wherein the second transmission module is further adapted for establishing a plurality of second communication channels connecting to the terminal devices, and sending and receiving a message to and from the terminal devices respectively based on a Message Queuing Telemetry Transport communication protocol,
wherein the second transmission module transmits the control commands of the human machine interface device to the corresponding terminal devices via the second communication channels.

8. The Internet of Things system according to claim 6, wherein the cloud device further comprises:
a storage module, comprising:
a device connection unit, adapted for storing a plurality of pieces of device connection information of the human machine interface device and the terminal devices;
a device data unit, adapted for storing a plurality of Internet of Things messages of the human machine interface device and the terminal devices; and
a terminal device management module, comprising:
a message classifying unit, adapted for classifying the pieces of device connection information and the Internet of Things messages received by the second transmission module and storing the pieces of device connection information and the Internet of Things messages into the device data unit and the device connection unit.

9. The Internet of Things system according to claim 8, wherein the cloud device further comprises:
a human machine interface device management module, comprising:
a scheduling unit, adapted for monitoring the device connection information of the human machine interface device stored in the device connection unit to generate a message push schedule.

10. The Internet of Things system according to claim 9, wherein the human machine interface device management module further comprises:
a message organizing unit, adapted for organizing the Internet of Things messages of the terminal devices stored in the device data unit to generate an organized message.

11. The Internet of Things system according to claim 8, wherein the terminal device management module further comprises:
a device control unit, adapted for receiving the organized message provided by the message organizing unit and transmitting the organized message to the human machine interface device via the first dedicated communication channel connecting to the human machine interface device according to the message push schedule.

12. The Internet of Things system according to claim 11, wherein the terminal device management module further comprises:
a message monitoring unit, adapted for monitoring the device data unit to determine whether at least one of the terminal devices has not returned the Internet of Things message; and
a device control unit, adapted for exploring the terminal devices,
wherein when the message monitoring unit determines that at least one of the terminal devices has not returned the Internet of Things message, the message monitoring unit transmits a status report command to at least one of the terminal devices via a second dedicated communication channel connecting to at least one of the terminal devices through the device control unit, so that at least one of the terminal devices returns the Internet of Things message according to the status report command.

13. The Internet of Things system according to claim 12, wherein the terminal device management module further comprises:
a message register unit, adapted for temporarily storing the control commands,
wherein the message monitoring unit is further adapted for monitoring whether the control commands temporarily stored in the message register unit have completed being transmitted to the corresponding terminal devices, and when the message monitoring unit determines that at least another one of the control commands has timed out and has not completed being transmitted to the corresponding terminal device, the message monitoring unit retransmits the at least another one of the control commands via the second dedicated communication channel connecting to the corresponding terminal device through the device control unit.

14. The Internet of Things system according to claim 13, wherein when the second transmission module receives a request control command via the first dedicated communication channel, the message classifying unit temporarily stores the request control command to the message register unit, and the message monitoring unit transmits the request control command to the corresponding terminal device via the second dedicated communication channel connecting to the corresponding terminal device through the device control unit.

15. The Internet of Things system according to claim 8, wherein the Internet of Things messages respectively comprise at least one of a piece of device status information, a piece of sensing data, and a reply command.

16. The Internet of Things system according to claim 1, wherein the terminal devices respectively comprise:
   a third transmission module, adapted for establishing the second communication channels connecting to the cloud device, and sending and receiving a message to and from the cloud device based on a Message Queuing Telemetry Transport communication protocol.

17. The Internet of Things system according to claim 16, wherein the terminal devices further comprise:
   a second application function module, adapted for receiving the corresponding control command and generating a corresponding Internet of Things message, so as to return the corresponding Internet of Things message to the cloud device via the third transmission module.

18. The Internet of Things system according to claim 1, wherein a number of terminal devices is greater than a number of first communication channels.

* * * * *